Patented Aug. 15, 1950

2,518,666

UNITED STATES PATENT OFFICE 2,518,666

METHOD OF PREPARING GELATIN DERIVATIVES

Rudolph E. Damschroder and John W. Gates, Jr., Rochester, N. Y., assignors to Eastman Kodak Company, Rochester, N. Y., a corporation of New Jersey No Drawing. Application August 13, 1947, Serial No. 768,482

13 Claims. (Cl. 260—117)

This invention relates to the preparation of gelatin derivatives in a system in which formamide is employed as the solvent.

Previously the preparation of gelatin derivatives has been described in which glacial acetic acid has been employed as the solvent, such as described in U. S. Patent No. 2,179,244. In the preparation of gelatin derivatives in accordance with that process, however, the gelatin experiences breakdown so that the final products are degraded or of low viscosity. The preparation of gelatin derivatives has also been described in which the gelatin was first dissolved in water and then reacted. In many preparations of this type the water exerted a hydrolyzing influence upon the reagents which entered into the preparation of the gelatin derivative and, therefore, necessitated the use of larger proportions of reagents than would otherwise be necessary.

One object of our invention is to provide a process for preparing gelatin derivatives in which the gelatin is not subjected to breakdown conditions, and hydrolysis of the reagents is avoided. Other objects of our invention will appear herein.

In its broadest aspects our invention comprises the preparation of derivatives of gelatin in systems in which formamide is employed as the solvent. Ordinarily, the method employed is to first dissolve the gelatin or other protein in formamide and then react the gelatin while in solution with the reagent. After the reaction has occurred, the gelatin derivative formed may be readily separated from the formamide.

Our invention relates to the preparation of derivatives, not only of gelatin but of other protein materials, such as zein, albumen, casein, soybean protein and the like. We have found that proteins of this type which are soluble or readily dispersable in formamide are readily reacted upon by reagents which will produce derivatives thereof.

Our invention broadly comprises the preparation of protein derivatives generally in a solution or dispersion of formamide under conditions in which little or no water is present and in which the presence of degrading reagents, such as glacial acetic acid and the like, is avoided. In accordance with our invention there should be no more than 10% of water present in the formamide and preferably the water content should be no more than is present in the ordinary technical formamide. In cases where reagents are employed which are very reactive, it is especially desirable to restrict the proportion of water present to the lowest amount which is possible under the conditions of operation.

Derivatives of gelatin and other proteins are prepared by reacting thereon with various types of reagents. For instance, the derivatives of gelatin or other proteins may be prepared by reacting thereon with acid anhydrides or acid chlorides, whether of the carboxyl or the sulfonyl type, both aliphatic and aromatic, and saturated and unsaturated compounds. Some of the carboxyl anhydrides which may be employed are phthalic anhydride, maleic anhydride, succinic anhydride, benzoic anhydride, isatoic anhydride, methacrylic anhydride, and 3,4-dibromo phthalic anhydride. Some of the aryl and alkyl carboxy chlorides which may be employed to react with gelatin or other proteins to form gelatin derivatives are benzoyl chloride, p-nitro benzoyl chloride, benzyl chloro carbonate, 1-hydroxy-2-naphthoyl chloride, o-hydroxy benzoyl chloride, phthalyl chloride, ethyl chlorocarbonate, and α-furoyl chloride. Some of the sulfonyl chlorides which may be employed to react upon gelatin or other proteins to prepare derivatives in accordance with our invention are benzene sulfonyl chloride, naphthoyl α or β sulfonyl chloride, p-bromo benzene sulfonyl chloride, p-methoxy benzene sulfonyl chloride, p-phenoxy benzene sulfonyl chloride, p-toluene sulfonyl chloride, m-nitrobenzene sulfonyl chloride, m-carboxy benzene sulfonyl chloride, p-chloro sulfonyl chloride, 4-amino-3-nitro benzene sulfonyl chloride, 2,4-dichloro benzene sulfonyl chloride, quinoline-8-sulfonyl chloride, 2-nitro-p-toluene sulfonyl chloride, m-sulfo benzoyl dichloride, and 1-chloro benzene-2,4-disulfonyl dichloride. The isocyanates and isothiocyanates are also useful for preparing derivatives of gelatin or other proteins. Some of the compounds which may be employed to prepare derivatives of this nature are phenyl isocyanate, p-bromo phenyl isocyanate, p-tolyl isocyanate, p-nitro phenyl isocyanate, α and β naphthyl isocyanate, and phenyl isothiocyanate. Some compounds react with proteins to form derivatives by addition, such as nitriles like $CH_2=CHCN$. Our invention contemplates the reaction of any of these compounds with gelatin or other protein in solution or suspension in formamide. Our invention involves a process in which the gelatin or other protein is first intimately associated with an excess of formamide, such as by forming a solution or dispersion of the protein in the formamide whereupon the reagent which is to react with the gelatin or other protein is added and the intimate association is continued. Ordinarily a material is preferably added to the mass which imparts a basic condition thereto to absorb or neutralize any acid which is formed in the reaction. This is not always necessary, however, and in those cases where an additional reaction is involved, such as where isocyanates are employed in the preparation of the protein derivatives, the basic addition serves no useful purpose. The amount of basic material which is added is preferably that sufficient to take care of the acid groups which are liberated in the reaction.

The base which is employed to promote the reaction may be either an inorganic base, such as sodium hydroxide or ammonium hydroxide, or it may be an organic base, such as pyridine, tetramethyl ammonium hydroxide, or the like. The proportion of formamide employed is not critical. However, it is desirable that sufficient formamide be used so that the gelatin or other protein be well dispersed therein at the time the reagent which is to be reacted therewith is added. For instance, proportions which have been found to be very satisfactory are one part of protein in 10 to 15 parts of formamide. This, however, is merely a proportion for convenience, and solutions or dispersions more dilute or more concentrated might be employed if desired. Ordinarily, the reaction of the protein and the reagent which reacts therewith goes suitably at ordinary temperatures. If, however, speeding up of the reaction is desired, elevated temperatures may be employed.

The following examples illustrate the preparation of protein derivatives in accordance with our invention:

*Example 1.*—A 10% solution of gelatin in formamide was formed and a weight of dried phthalic anhydride equal to 30% of the dry weight of the gelatin was added thereto. There was then added with stirring at 40° C. 0.013 mole of sodium hydroxide in solution in alcohol per mole of phthalic anhydride. The mass was stirred for 20 minutes. A gelatin derivative was formed which was precipitated from the mass using a large excess of acetone. The resulting gelatin derivative after separating from the liquid was dissolved in water, chilled to solidify the same, and then washed free of salts.

*Example 2.*—20 parts of calfskin gelatin were dissolved in 200 parts of anhydrous formamide. While stirring, there was added thereto 3 parts of benzoyl chloride and 2 parts of pyridine. The stirring was continued for one hour, forming a viscous solution which was poured into a large excess of acetone. The gelatin derivative formed precipitated in the acetone, which precipitate was separated therefrom and redispersed in 150 parts of water. The gelatin derivative was then chilled and set, whereupon it was washed two hours in cold water, melted, and the solution was subjected to reduced pressure, followed by again chilling, slicing, and drying the same. It was found that approximately 20 parts of gelatin derivative had been prepared.

*Example 3.*—A solution was prepared of 20 parts of gelatin in approximately 200 parts of formamide. Two parts of benzene sulfonyl chloride and 2 parts of a 10% aqueous solution of tetramethyl ammonium hydroxide were added, and the mass was stirred for one hour. The gelatin derivative formed was recovered by pouring the mass into acetone and washing it in the usual manner. 18–20 parts of gelatin derivative were obtained.

*Example 4.*—A solution of 20 parts of gelatin and 200 parts of formamide was formed by stirring for one hour at room temperature. This mass was then treated with 2½ parts of methacrylic anhydride for two hours at room temperature. A viscous solution was formed thereby, which solution was shredded in acetone and the shreds were washed with cold water.

*Example 5.*—20 parts of calfskin gelatin were dispersed in 200 parts of formamide and stirred for two hours at 120–130° F. with 4 parts of acrylonitrile and 2 parts of pyridine. The gelatin derivative formed was isolated as in the preceding examples, giving a product having a yield of 20 parts.

*Example 6.*—A solution of 20 parts of gelatin in 200 parts of formamide was stirred for two hours at room temperature with 3 parts of phenyl isocyanate. The derivative so formed was separated from the mass by pouring it into 500 parts of acetone (or alcohol). The precipitated material was redispersed in 150 parts of water and processed as described in the preceding examples.

*Example 7.*—A solution of 20 parts of gelatin in 200 parts of formamide was stirred in 1½ parts of ethyl isothiocyanate and 2 parts of 20% sodium hydroxide solution for two hours. The derivative was isolated in the usual manner. 20 parts of gelatin derivative were obtained.

*Example 8.*—A solution of 20 parts of calfskin gelatin in 200 parts of formamide was stirred for twenty-four hours in a mixture of 2 parts of maleic anhydride and 2 parts of 20% sodium hydroxide solution. The maleyl derivative of gelatin was formed which was isolated by pouring into acetone and processing in the manner described in the preceding examples. 18–20 parts of maleyl gelatin were obtained.

*Example 9.*—A solution of 20 parts of calfskin gelatin in 200 parts of formamide was treated for two hours at 120–130° F. with 2 parts of phthalic anhydride and 2 parts of pyridine. The resulting mass was poured into acetone whereby the gelatin derivative coagulated. The coagulated material was redispersed in the 150 parts of water, chilled, shredded, washed two hours in cold water, melted and evacuated to 150 parts. The mass was chilled whereby the solution set and was sliced and dried in the usual manner. A yield of 20 parts was obtained.

*Example 10.*—A solution of 20 parts of zein in 200 parts of formamide was mixed for two hours at room temperature with 20 parts of acrylonitrile and 2 parts of 10% aqueous tetramethyl ammonium hydroxide solution. A zein derivative forms which was isolated by pouring into water. The zein derivative was found to be soluble in acetone.

*Example 11.*—A solution in 20 parts of gelatin and 200 parts of anhydrous formamide was stirred for three hours at 120° F. with 2 parts of phthalic anhydride using 2 parts of pyridine as catalyst. The phthalic anhydride derivative was isolated by pouring the mass into acetone, redispersing the derivative in water, and processing in the usual manner. The yield was 20 parts.

*Example 12.*—2 parts of finely ground blood albumin were dispersed in 200 parts of formamide, and 1 part of benzene sulfonyl chloride was added to the dispersion and stirred for ½ hour. The derivative formed was separated from the liquid by pouring the mass into acetone.

We claim:

1. A method of preparing protein derivatives which comprises mixing a protein and a reactant therefor selected from the group consisting of acid anhydrides of the carboxylic and sulfonyl acids, acid chlorides of the carboxylic and sulfonyl acids, isocyanates, isothiocyanates, and nitriles of unsaturated hydrocarbons in formamide containing less than 10% of water as the reaction medium for a time sufficient to cause reaction between the protein and the reactant.

2. A method of preparing gelatin derivatives which comprises mixing gelatin and a reactant therefor selected from the group consisting of acid anhydrides of the carboxylic and sulfonyl acids, acid chlorides of the carboxylic and sulfonyl acids, isocyanates, isothiocyanates, and nitriles of unsaturated hydrocarbons in formamide containing less than 10% of water as the reaction medium for a sufficient time to cause substantial reaction between the gelatin and the reactant.

3. A method of preparing protein derivatives which comprises mixing a protein, a reactant therfor selected from the group consisting of acid anhydrides of the carboxylic and sulfonyl acids, acids chlorides of the carboxylic and sulfonyl acids, isocyanates, isothiocyanates, and nitriles of unsaturated hydrocarbons, and a base in formamide containing less than 10% of water, as the reaction medium for a sufficient time to cause a substantial reaction between the protein and the reactant.

4. A method of preparing gelatin derivatives which comprises mixing gelatin, a reactant therefor selected from the group consisting of acid anhydrides of the carboxylic and sulfonyl acids, acid chlorides of the carboxylic and sulfonyl acids, isocyanates, isothiocyanates, and nitriles of unsaturated hydrocarbons, and a base in formamide containing less than 10% of water as the reaction medium for a time sufficient to cause substantial reaction between the gelatin and the reactant.

5. A method of preparing a phthalic anhydride derivative of gelatin which comprises mixing gelatin and phthalic anhydride in formamide containing less than 10% of water for a time sufficient to cause substantial formation of the phthalic anhydride derivative of the gelatin.

6. A method of preparing a phthalic anhydride derivative of gelatin which comprises mixing gelatin, phthalic anhydride, and a base in formamide containing less than 10% of water for a time sufficient to cause a substantial reaction to occur.

7. A method of preparing a benzene sulfonyl chloride derivative of gelatin which comprises mixing gelatin and benzene sulfonyl chloride in formamide containing less than 10% of water for a time sufficient to cause substantial reaction to occur.

8. A method of preparing a benzene sulfonyl chloride derivative of gelatin which comprises mixing gelatin, benzene sulfonyl chloride, and a base in formamide containing less than 10% of water for a time sufficient to cause the reaction to occur.

9. A method of preparing gelatin derivatives which comprises mixing gelatin, a reactant therefor selected from the group consisting of acid anhydrides of the carboxylic and sulfonyl acids, acid chlorides of the carboxylic and sulfonyl acids, isocyanates, isothiocyanates, and nitriles of unsaturated hydrocarbons, and a dilute solution of sodium hydroxide in formamide containing less than 10% of water as the reaction medium for a sufficient time to cause substantial reaction to occur.

10. A method of preparing gelatin derivatives which comprises mixing gelatin, a reactant therefor selected from the group consisting of acid anhydrides of the carboxylic and sulfonyl acids, acid chlorides of the carboxylic and sulfonyl acids, isocyanates, isothiocyanates, and nitriles of unsaturated hydrocarbons, and a small proportion of a dilute solution of tetramethyl ammonium hydroxide in formamide containing less than 10% of water as the reaction medium for a sufficient time to cause a substantial reaction to occur.

11. A method of preparing protein derivatives which comprises mixing an animal protein and a reactant therefor selected from the group consisting of acid anhydrides of the carboxylic and sulfonyl acids, acid chlorides of the carboxylic and sulfonyl acids, isocyanates, isothiocyanates, and nitriles of unsaturated hydrocarbons in formamide containing less than 10% of water as the reaction medium for a sufficient time to cause reaction between the protein and the reactant.

12. A method of preparing protein derivatives which comprises mixing blood albumin and a reactant therefor selected from the group consisting of acid anhydrides of the carboxylic and sulfonyl acids, acid chlorides of the carboxylic and sulfonyl acids, isocyanates, isothiocyanates, and nitriles of unsaturated hydrocarbons, in formamide containing less than 10% of water as the reaction medium for a sufficient time to cause reaction between the blood albumin and the reactant.

13. A method of preparing protein derivatives which comprises mixing casein and a reactant therefor selected from the group consisting of acid anhydrides of the carboxylic and sulfonyl acids, acid chlorides of the carboxylic and sulfonyl acids, isocyanates, isothiocyanates, and nitriles of unsaturated hydrocarbons, in formamide containing less than 10% of water as the reaction medium for a sufficient time to cause reaction between the casein and the reactant.

RUDOLPH E. DAMSCHRODER.
JOHN W. GATES, Jr.

REFERENCES CITED

The following references are of record in the file of this patent:

UNITED STATES PATENTS

| Number | Name | Date |
|---|---|---|
| 2,101,574 | Dangelmajer | Dec. 7, 1937 |
| 2,236,768 | Veatch | Apr. 1, 1941 |
| 2,363,892 | Monier | Nov. 28, 1944 |

FOREIGN PATENTS

| Number | Country | Date |
|---|---|---|
| 470,482 | Great Britain | Nov. 7, 1935 |

OTHER REFERENCES

Chemical Abstracts, vol. 6 (1912), page 1394.
Nature, Jan. 18, 1912, page 387.